United States Patent
Funk

[19]

[11] Patent Number: 6,152,332
[45] Date of Patent: Nov. 28, 2000

[54] GROUT DISPENSER SYSTEM

[76] Inventor: Shannon J. Funk, 14440 E. Vallejo St., Chandler, Ariz. 85249

[21] Appl. No.: 09/473,727

[22] Filed: Dec. 28, 1999

[51] Int. Cl.[7] ................................................ G01F 11/06
[52] U.S. Cl. ........................... 222/323; 222/568; 222/575
[58] Field of Search ................................. 222/323, 324, 222/326, 327, 386, 568, 575

[56] References Cited

U.S. PATENT DOCUMENTS

| | | | |
|---|---|---|---|
| 2,138,696 | 11/1938 | Francis | 18/3.5 |
| 2,229,839 | 1/1941 | Crewe | 74/169 |
| 2,420,203 | 5/1947 | Sherbondy | 222/323 |
| 2,707,068 | 4/1955 | Williamson | 222/324 |
| 2,725,595 | 12/1955 | Sisk et al. | 18/3.5 |
| 3,076,225 | 2/1963 | Sherbondy | 18/3.5 |
| 3,953,006 | 4/1976 | Patarcity et al. | 259/191 |
| 4,199,311 | 4/1980 | Ferris et al. | 425/173 |
| 4,201,318 | 5/1980 | Adams | 222/324 |
| 5,419,458 | 5/1995 | Mayer | 222/324 |
| 5,743,431 | 4/1998 | Brattesani | 222/326 |

*Primary Examiner*—Kevin Shaver
*Assistant Examiner*—Thach Bui
*Attorney, Agent, or Firm*—Joseph N. Breaux

[57] ABSTRACT

A grout dispensing system that includes an injector having a number of user selectable dispensing nozzles that allow an individual to select a desired dispensing opening diameter for a particular job and which includes a piston/plunger for forcing grout out of the nozzle under pressure into the gap between tiles to ensure that a proper amount of grout is within the gap. The injector includes a hand grip assembly that is gripped by a user with one hand while simultaneously pushing the plunger/piston into the injector cylinder.

1 Claim, 3 Drawing Sheets

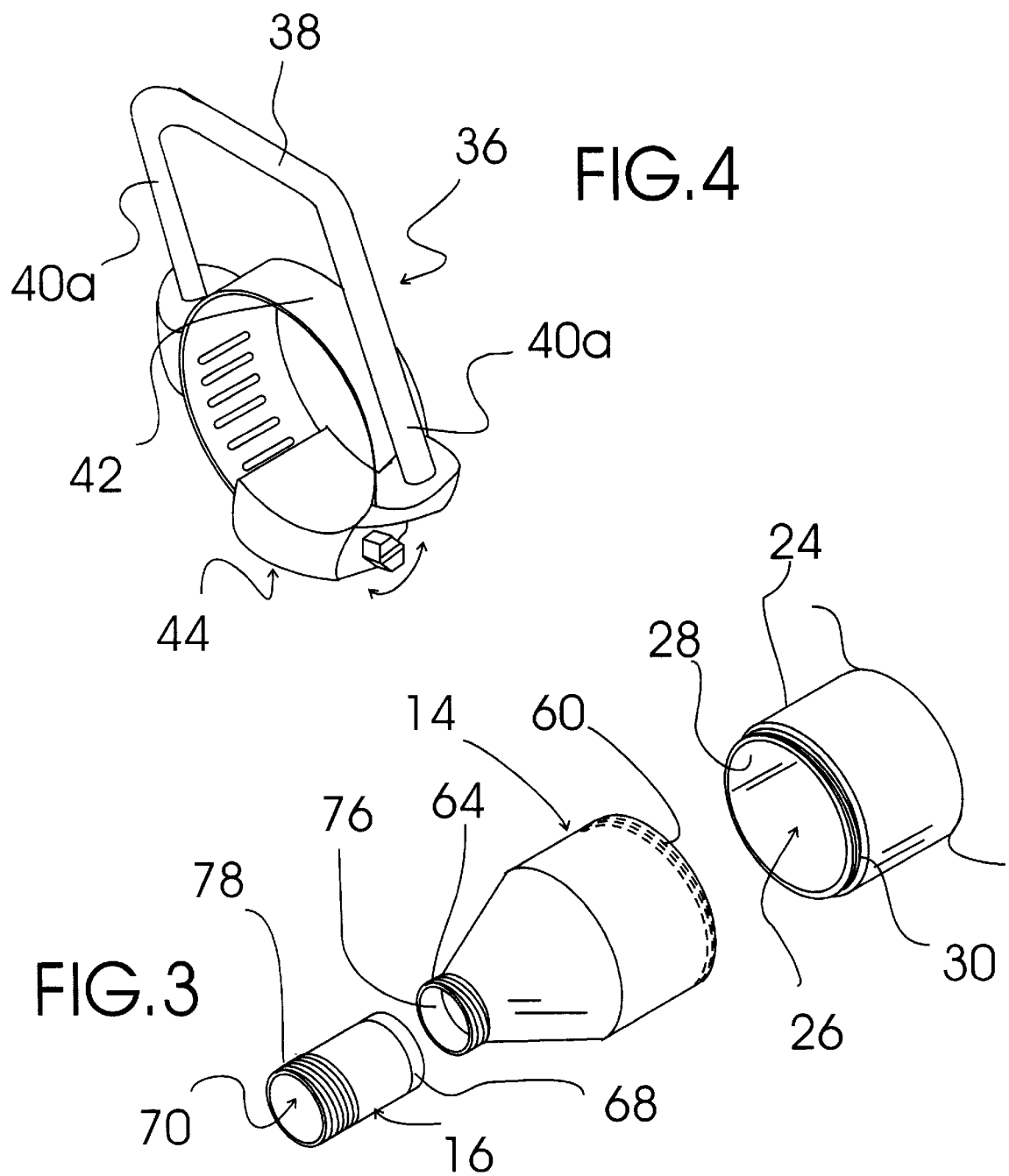

GROUT DISPENSER SYSTEM

TECHINICAL FIELD

The present invention relates to tile setting equipment and more particularly to a grout dispenser system that includes an injector assembly, a tubular injector nose piece, and a number of nozzle tips including one straight nozzle tip and one tapered nozzle tip; the injector assembly being constructed of plastic and including a cylinder tube assembly and a plunger assembly; the cylinder tube assembly including an injector tube having a piston passageway defined by a smooth cylinder bore wall and formed between an open exteriorly threaded tip end and an open handle end and a detachable hand grip assembly including a U-shaped gripping portion having the gripping portion ends thereof permanently attached to the band of a worm drive hose clamp of sufficient size to slide over the exterior of the injector tube and tightenable to grip and adjustably secure the detachable hand grip assembly to the injector tube; the plunger assembly including a shaft terminating at one end in a piston head having an o-ring in slidable sealing relationship with the smooth cylinder bore wall of the injector tube and a ring shaped handle covered with a resilient plastic coating that defines a finger passageway sized to receive the fingers of a user therethrough; the tubular injector nose piece having an internally threaded injector tube connecting end sized and companionately threaded to companionately threadably engage the open exteriorly threaded tip end of the injector tube, the tubular injector nose piece tapering down to a smaller diameter and terminating in an exteriorly threaded open ended nozzle tip connecting end; each of the nozzle tips having a nozzle passageway in connection between an interiorly threaded open ended nose piece connecting end companionately threaded to threadably engage and secure the nozzle tip to the exteriorly threaded open ended nozzle tip connecting end and a dispensing end having a dispensing opening having a diameter no greater than the diameter of the opening of the exteriorly threaded open ended nozzle tip connecting end; the straight nozzle tip having an exteriorly threaded dispensing end threaded and sized to companionately threadably engage the interiorly threaded open ended nose piece connecting end of the remaining nozzle tips.

BACKGROUND ART

Many tile setters find it difficult to fill the gaps between tiles with the correct quantity of grout. It would be a benefit to these individuals to have a grout dispensing system that included an injector having a number of user selectable dispensing nozzles that allowed an individual to select a desired dispensing opening diameter for a particular job and which included a piston/plunger for forcing grout out of the nozzle under pressure into the gap between tiles to ensure that a proper amount of grout is within the gap. Because it can be difficult to manually press a piston/plunger into a cylinder to generate the required dispensing pressure, it would be a further benefit if the injector included a hand grip assembly that could be gripped by a user with one hand while simultaneously pushing the plunger/piston into the injector cylinder.

GENERAL SUMMARY DISCUSSION OF INVENTION

It is thus an object of the invention to provide a grout dispenser system that includes an injector assembly, a tubular injector nose piece, and a number of nozzle tips including one straight nozzle tip and one tapered nozzle tip; the injector assembly being constructed of plastic and including a cylinder tube assembly and a plunger assembly; the cylinder tube assembly including an injector tube having a piston passageway defined by a smooth cylinder bore wall and formed between an open exteriorly threaded tip end and an open handle end and a detachable hand grip assembly including a U-shaped gripping portion having the gripping portion ends thereof permanently attached to the band of a worm drive hose clamp of sufficient size to slide over the exterior of the injector tube and tightenable to grip and adjustably secure the detachable hand grip assembly to the injector tube; the plunger assembly including a shaft terminating at one end in a piston head having an o-ring in slidable sealing relationship with the smooth cylinder bore wall of the injector tube and a ring shaped handle covered with a resilient plastic coating that defines a finger passageway sized to receive the fingers of a user therethrough; the tubular injector nose piece having an internally threaded injector tube connecting end sized and companionately threaded to companionately threadably engage the open exteriorly threaded tip end of the injector tube, the tubular injector nose piece tapering down to a smaller diameter and terminating in an exteriorly threaded open ended nozzle tip connecting end; each of the nozzle tips having a nozzle passageway in connection between an interiorly threaded open ended nose piece connecting end companionately threaded to threadably engage and secure the nozzle tip to the exteriorly threaded open ended nozzle tip connecting end and a dispensing end having a dispensing opening having a diameter no greater than the diameter of the opening of the exteriorly threaded open ended nozzle tip connecting end; the straight nozzle tip having an exteriorly threaded dispensing end threaded and sized to companionately threadably engage the interiorly threaded open ended nose piece connecting end of the remaining nozzle tips.

Accordingly, a grout dispenser system is provided. The grout dispenser system includes an injector assembly, a tubular injector nose piece, and a number of nozzle tips including one straight nozzle tip and one tapered nozzle tip; the injector assembly being constructed of plastic and including a cylinder tube assembly and a plunger assembly; the cylinder tube assembly including an injector tube having a piston passageway defined by a smooth cylinder bore wall and formed between an open exteriorly threaded tip end and an open handle end and a detachable hand grip assembly including a U-shaped gripping portion having the gripping portion ends thereof permanently attached to the band of a worm drive hose clamp of sufficient size to slide over the exterior of the injector tube and tightenable to grip and adjustably secure the detachable hand grip assembly to the injector tube; the plunger assembly including a shaft terminating at one end in a piston head having an o-ring in slidable sealing relationship with the smooth cylinder bore wall of the injector tube and a ring shaped handle covered with a resilient plastic coating that defines a finger passageway sized to receive the fingers of a user therethrough; the tubular injector nose piece having an internally threaded injector tube connecting end sized and companionately threaded to companionately threadably engage the open exteriorly threaded tip end of the injector tube, the tubular injector nose piece tapering down to a smaller diameter and terminating in an exteriorly threaded open ended nozzle tip connecting end; each of the nozzle tips having a nozzle passageway in connection between an interiorly threaded open ended nose piece connecting end companionately threaded to threadably engage and secure the nozzle tip to the exteriorly threaded open ended nozzle tip connecting end and a dispensing end having a dispensing opening having a diameter no greater than the diameter of the opening of the exteriorly threaded open ended nozzle tip connecting end; the straight nozzle tip having an exteriorly threaded dispensing end threaded and sized to companionately threadably engage the interiorly threaded open ended nose piece connecting end of the remaining nozzle tips.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 3 is an exploded, partial perspective view showing the open exteriorly threaded tip end of the injector tube, the tubular injector nose piece, and the straight nozzle tip end.

FIG. 4 is a perspective view of the detachable hand grip assembly in isolation showing the U-shaped gripping portion having the gripping portion ends thereof permanently attached to the band of the worm drive hose clamp.

EXEMPLARY MODE FOR CARRYING OUT THE INVENTION

Figure 1:
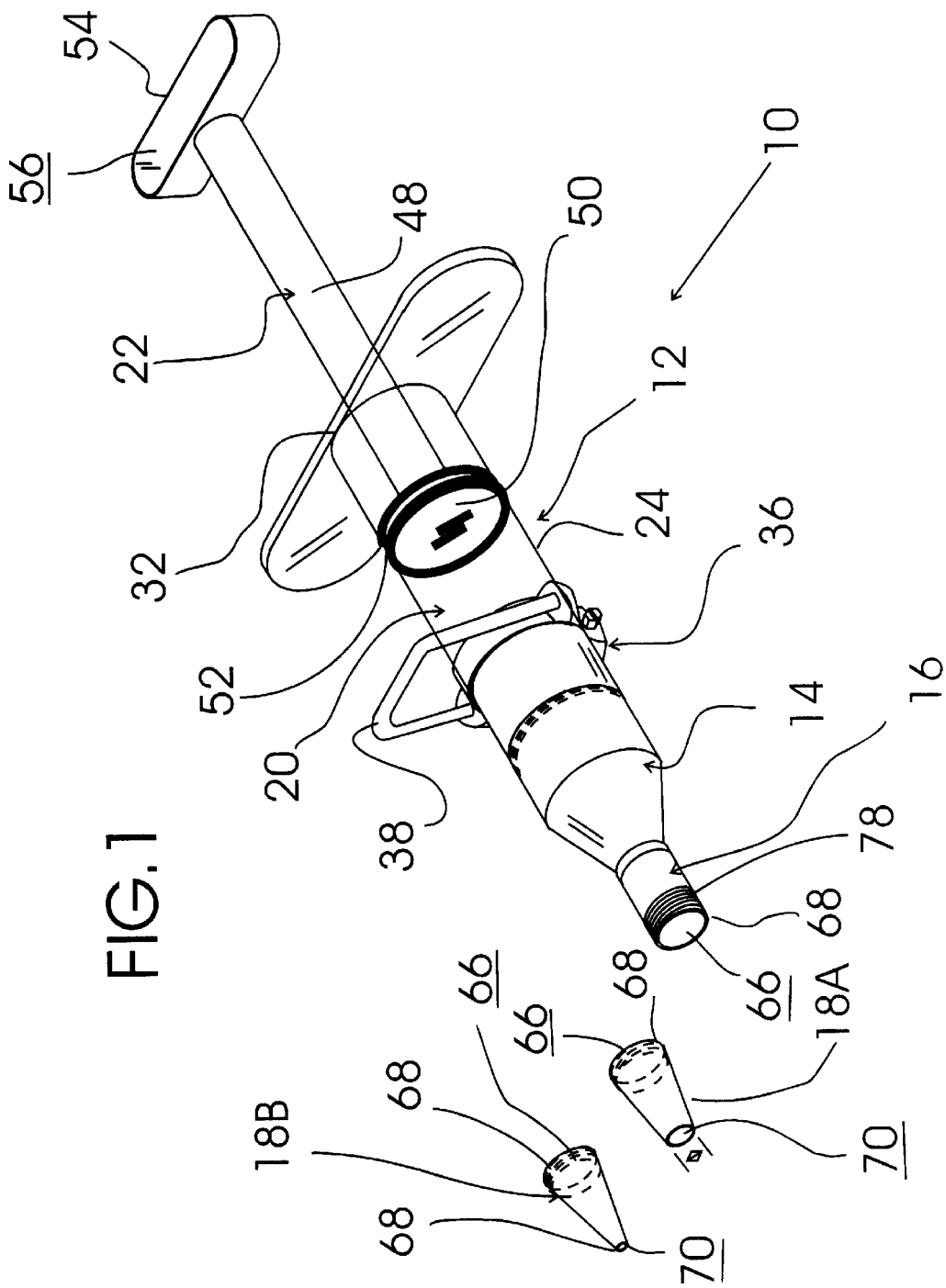
FIG. 1 is a perspective view of an exemplary embodiment of the grout dispenser system of the present invention showing the injector assembly, the tubular injector nose piece, and three representative nozzle tips including one straight nozzle tip and two tapered nozzle tips; the injector assembly being constructed of plastic and including a cylinder tube assembly and a plunger assembly; the cylinder tube assembly including an injector tube having a piston passageway defined by a smooth cylinder bore wall and formed between an open exteriorly threaded tip end and an open handle end and a detachable hand grip assembly including a U-shaped gripping portion having the gripping portion ends thereof permanently attached to the band of a worm drive hose clamp of sufficient size to slide over the exterior of the injector tube and tightenable to grip and adjustably secure the detachable hand grip assembly to the injector tube; the plunger assembly including a shaft terminating at one end in a piston head having an o-ring in slidable sealing relationship with the smooth cylinder bore wall of the injector tube and a ring shaped handle covered with a resilient plastic coating that defines a finger passageway sized to receive the fingers of a user therethrough; the tubular injector nose piece having an internally threaded injector tube connecting end sized and companionately threaded to companionately threadably engage the open exteriorly threaded tip end of the injector tube, the tubular injector nose piece tapering down to a smaller diameter and terminating in an exteriorly threaded open ended nozzle tip connecting end; each of the nozzle tips having a nozzle passageway in connection between an interiorly threaded open ended nose piece connecting end companionately threaded to threadably engage and secure the nozzle tip to the exteriorly threaded open ended nozzle tip connecting end and a dispensing end having a dispensing opening having a diameter no greater than the diameter of the opening of the exteriorly threaded open ended nozzle tip connecting end; the straight nozzle tip having an exteriorly threaded dispensing end threaded and sized to companionately threadably engage the interiorly threaded open ended nose piece connecting end of the remaining nozzle tips.
Figure 2:
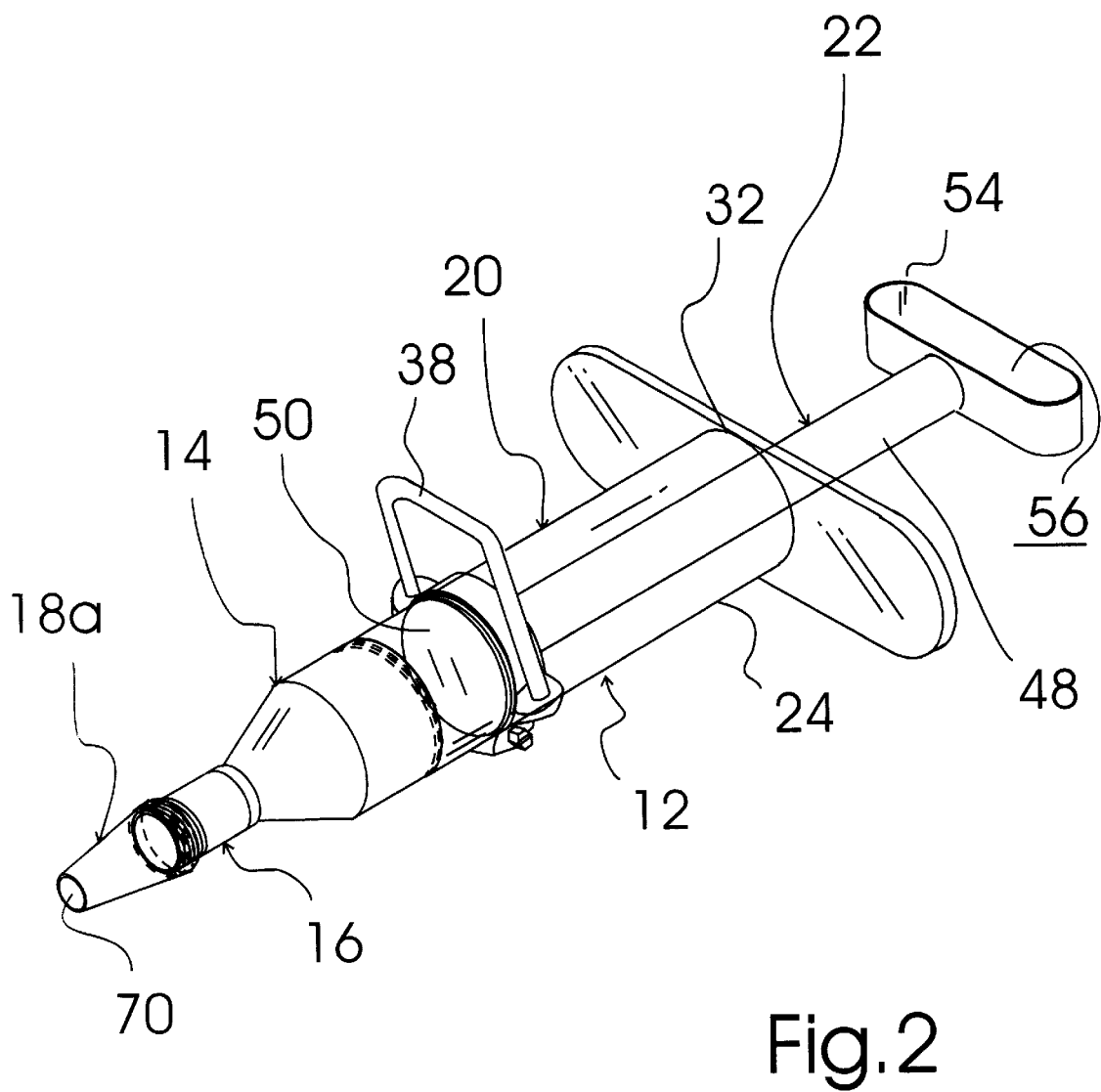
FIG. 2 is a perspective view of the of the grout dispenser of FIG. 1 with a tapered nozzle tip threaded onto the straight nozzle tip and the plunger assembly partially pushed into the piston passageway of the injector tube.

FIGS. 1–4 shows various aspects of an exemplary embodiment of the grout dispenser system of the present invention generally designated 10. Grout dispenser system 10 includes an injector assembly, generally designated 12; a tubular injector nose piece, generally designated 14; and three nozzle tips including one straight nozzle tip, generally designated 16, and two tapered nozzle tips, generally designated 18a, 18b, respectively.

Injector assembly 12 includes a cylinder tube assembly, generally designated 20 and a plunger assembly, generally designated 22. Cylinder tube assembly 20 includes a plastic injector tube having a piston passageway 26 defined by a smooth cylinder bore wall 28 and formed between an open exteriorly threaded tip end 30 and an open handle end 32 and a detachable hand grip assembly, generally designated 36 including a U-shaped gripping portion 38 having the gripping portion ends 40a, 40b thereof permanently attached to a band 42 of a worm drive hose clamp, generally designated 44 of sufficient size to slide over the exterior of injector tube 24 and tightenable to grip and adjustably secure detachable hand grip assembly 36 to injector tube 24.

Plunger assembly 22 includes a plastic shaft 48 terminating at one end in a piston head 50 having an o-ring 52 in slidable sealing relationship with smooth cylinder bore wall 28 of injector tube 24 and a ring shaped handle 54 covered with a resilient plastic coating that defines a finger passageway 56 sized to receive the fingers of a user therethrough.

Tubular injector nose piece 14 has an internally threaded injector tube connecting end 60 sized and companionately threaded to companionately threadably engage open exteriorly threaded tip end 30 of injector tube 24. Tubular injector nose piece 14 tapers down in size from the internally threaded injector tube connecting end 60 to a smaller diameter and terminates in an exteriorly threaded open ended nozzle tip connecting end 64.

Each of the nozzle tips 16, 18a, 18b has a nozzle passageway 66 in connection between an interiorly threaded open ended nose piece connecting end 68 companionately threaded to threadably engage and secure the nozzle tip 16, 18a, 18b to exteriorly threaded open ended nozzle tip connecting end 64 and a dispensing end 68 having a dispensing opening 70 having a diameter no greater than the diameter of opening 76 of exteriorly threaded open ended nozzle tip connecting end 64. Straight nozzle tip 16 has an exteriorly threaded dispensing end 78 threaded and sized to companionately threadably engage the interiorly threaded open ended nose piece connecting end 68 of tapered nozzle tips 18a, 18b. Tapered nozzle tip 18a tapers down to a one-quarter inch opening. Tapered nozzle tip 18b tapers down to a half inch opening.

It can be seen from the preceding description that a grout dispenser system has been provided.

It is noted that the embodiment of the grout dispenser system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A grout dispenser system comprising:
   an injector assembly;
   a tubular injector nose piece; and
   a number of nozzle tips including one straight nozzle tip and one tapered nozzle tip;

said injector assembly being constructed of plastic and including a cylinder tube assembly and a plunger assembly;

said cylinder tube assembly including an injector tube having a piston passageway defined by a smooth cylinder bore wall and formed between an open exteriorly threaded tip end and an open handle end and a detachable hand grip assembly including a U-shaped gripping portion having said gripping portion ends thereof permanently attached to said band of a hose clamp of sufficient size to slide over an exterior of said injector tube and tightenable to grip and adjustably secure said detachable hand grip assembly to said injector tube;

said plunger assembly including a shaft terminating at one end in a piston head having an o-ring in slidable sealing relationship with said smooth cylinder bore wall of said injector tube and a ring shaped handle that defines a finger passageway sized to receive the fingers of a user therethrough;

said tubular injector nose piece having an internally threaded injector tube connecting end sized and companionately threaded to companionately threadably engage said open exteriorly threaded tip end of said injector tube, said tubular injector nose piece tapering down to a smaller diameter and terminating in an exteriorly threaded open ended nozzle tip connecting end;

each of said nozzle tips having a nozzle passageway in connection between an interiorly threaded open ended nose piece connecting end companionately threaded to threadably engage and secure said nozzle tip to said exteriorly threaded open ended nozzle tip connecting end and a dispensing end having a dispensing opening having a diameter no greater than a diameter of said opening of said exteriorly threaded open ended nozzle tip connecting end;

said straight nozzle tip having an exteriorly threaded dispensing end threaded and sized to companionately threadably engage said interiorly threaded open ended nose piece connecting end of said tapered nozzle tip.

* * * * *